Nov. 8, 1966   W. R. SCHILKE   3,284,242
DEFERRED ACTION BATTERY
Filed Nov. 21, 1961
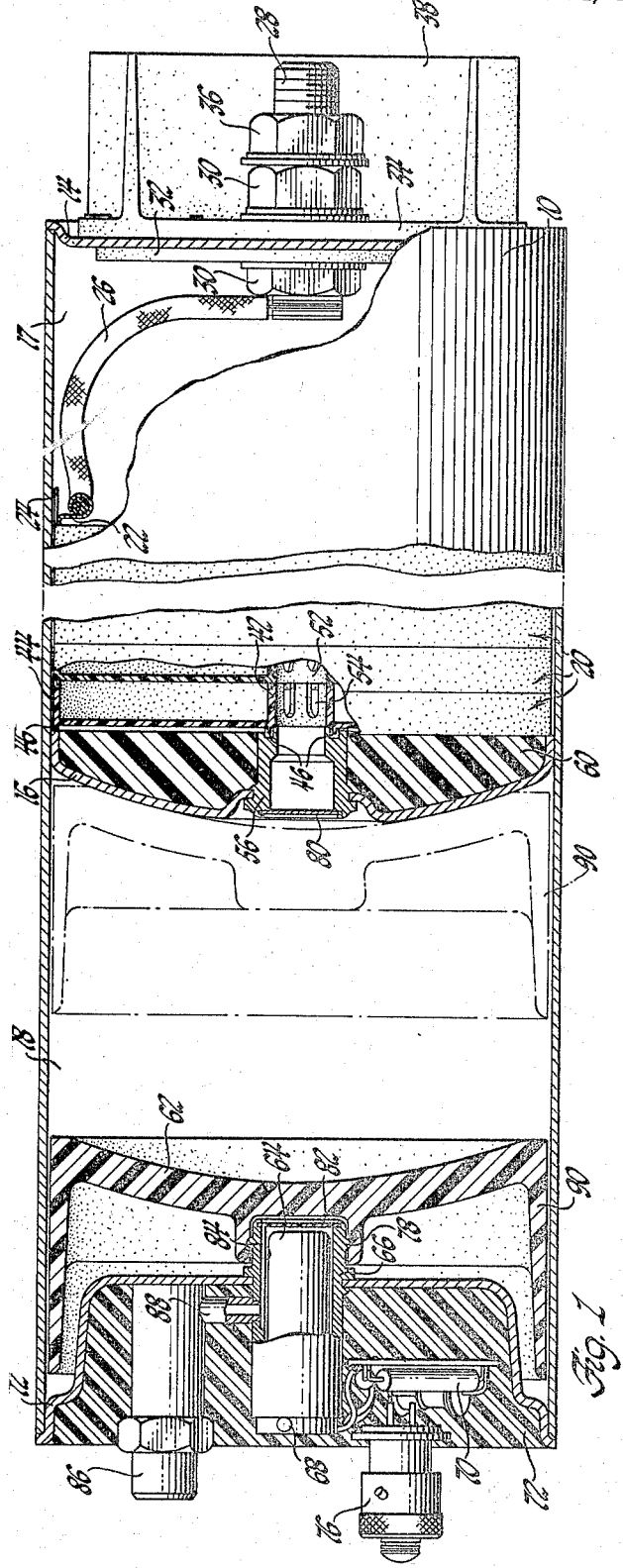
INVENTOR.
Warren R. Schilke
BY
R. J. Wallace
ATTORNEY

United States Patent Office 3,284,242
Patented Nov. 8, 1966

3,284,242
DEFERRED ACTION BATTERY
Warren R. Schilke, Anderson, Ind., assignor to General Motors Corporation, Detroit, Mich., a corporation of Delaware
Filed Nov. 21, 1961, Ser. No. 153,986
4 Claims. (Cl. 136—90)

This invention relates to a deferred action battery and more particularly to a compact, remotely activated, high rate, reserve-type battery, such as a silver oxide-zinc battery, which is especially useful as an electrical supply means for missiles and the like.

It is generally recognized that main electrical power supply for a ballistic missile must be extremely compact, very low in weight, high in power output for a short period of time and extremely reliable. The silver oxide-zinc reserve-type battery is the best that is presently available to fulfill these requirements. A reserve-type battery is one which is stored without electrolyte in contact with the battery plates. The battery is, therefore, inactive when stored and activated by contacting the battery plates with the battery electrolyte. Such a battery can be stored for indefinite periods of time and yet, when activated, virtually instantaneously provides the electrical power desired.

The reserve-type battery, therefore, must have an electrolyte reservoir and an electrolyte injection means along with the battery cells. For compactness, these are all housed in the same container. Hence, a cell unit, a reservoir unit and interconnecting conduits are separate parts involved which add weight and volume. The volume of the battery, as well as its weight, is enlarged further when these parts are packaged together in the same housing. I have found a battery construction which eliminates separate fabrication and packaging to reduce volume and weight of the battery.

One of the more objectionable factors associated with the present silver oxide-zinc reserve-type battery is that its reliability is not as high as is desired. Reliability of a missile battery is of obvious importance. It is quite apparent that if a battery fails in its mission so does the missile that depends on that battery. It is recognized that reliability is not only a function of quality but also a function of the number of parts involved. Hence, reliability can be increased without increasing quality by merely decreasing the number of interdependent parts. I have found a battery construction which is less complex than previous constructions and, hence, more reliable than previous batteries of this type.

Accordingly, a primary object of my invention is to provide an improved reserve-type battery construction which is more compact, lighter in weight and more highly reliable than battery constructions heretofore known.

Other objects, features and advantages of the invention will become more apparent from the following description of a preferred embodiment thereof and from the drawing, in which:

FIGURE 1 shows a longitudinal sectional view through a remotely activated, reserve-type battery formed in accordance with the invention;

FIGURE 2 shows an end view of the battery shown in FIGURE 1 with the associated plastic potting compound removed; and FIGURE 3 shows an individual voltaic cell container such as is used in forming the battery shown in FIGURE 1.

The invention comprehends a cylindrical reserve-type battery in which the battery housing, itself, forms an electrolyte reservoir and a voltaic cell compartment. The housing is transversely divided into two interconnected areas, one serving as the electrolyte reservoir and the other as a cell container. Hence, the cells of the battery and the reservoir are axially aligned within the housing. Means are provided in the housing for retaining the electrolyte in the reservoir until activation is desired and for inducing the electrolyte to flow from the reservoir through the transverse wall into the cells of the battery when the time of activation arrives. With annular cells registered in the cell compartment, an axial manifold is formed by individual cell containers, eliminating the need for a separate manifold construction.

Referring now to the drawing, FIGURE 1 shows a tubular housing 10 which has end plates 12 and 14, respectively, sealing each end. A transverse spheroidal plate 16 divides the sealed tube into two axially disposed sections 17 and 18. The area 18, between the divider plate 16 and the end closure plate 12, forms a reservoir for storage of battery electrolyte. A plurality of annular voltaic cell containers 20 are located in the other area 17. The cell containers are axially disposed from the reservoir and generally in peripheral register with it, while being in register with one another.

A conductor 22, insulated from the case 10 by means of an insulator 24, extends axially from the cell container next adjacent the divider plate 16 toward the end plate 14. An electrical lead 26 connects the axial conductor 22 to a battery terminal stud 28. The terminal 28 is secured to the end closure plate 14 by means of the nuts 30 and is insulated from the end closure plate 14 by means of the insulators 32 and 34. Exterior battery terminal connections are secured by means of the terminal nut 36.

Electrical connections for the other pole of the battery are similarly made. The second terminal of the battery (not shown) is disposed on the opposite side of the raised wall 38 on the insulator 34.

Each of the individual cells of the battery is housed in an annular three walled container 20, such as shown more clearly in connection with FIGURE 3. A plurality of positive and negative annular plates (not shown) are alternately disposed within the annular receptacle 20 in spaced relationship, as is the usual disposition of positive and negative plates in a voltaic cell.

The receptacle has an annular wall or disk portion 40 with upstanding walls 42 and 44 on the inner and outer peripheries, respectively. As can be seen more clearly in FIGURE 1, a small circumferential projection 46 is located on the back side of the annular disk 40 opposite each of the walls 42 and 44. The outer radial edges of the walls 42 and 44 are relieved at 48 corresponding to the projections 46 so that a plurality of similar containers, such as container 20, will nest together with interlocking projections 46 and relieved areas 48.

The outer wall 44 has diametrically opposed indentations 50 therein to accommodate the axially extending intercell connectors (not shown) of the cell assembly, if desired, and the axially extending conductor 22 and insulator 24. A series-type connection of an assembly of cells can be effected through wall 44 in the indented area 50. If it is so desired, the intercell connections can also be accomplished by extending conductors through the annular disk 40 in the manner described in my United States patent application Serial No. 153,987, entitled "Battery," which is concurrently filed and which is assigned to the assignee of the instant patent application.

As shown in FIGURE 1, a plurality of assembled cell containers 20 nest together to define a manifold 52. The manifold is in communication with the battery plates (not shown) by means of aperture 54 in the inner wall 42. A manifold coupler 56 in the divider plate 16 is secured to the manifold 52, thus providing communication between the electrolyte reservoir 18 and the battery plates within each cell container 20. The concave side of the spheroidal divider plate 16 is filled with a plastic potting composition 60 to provide a flat surface against which the adjacent cell container abuts. The spheroidal configuration of the divider plate 16 makes it stronger to withstand battery activation pressures. The plastic potting compound 60 adds to this strength and in addition provides the flat surface against which the first adjacent cell container rests. The plastic has circular grooves therein to accommodate the projections 46 on the container. A piston 62, formed of a material which is resistant to chemical attack by the battery electrolyte, is movably disposed in the reservoir 18 adjacent the end wall 12. It is preferred to form the piston out of a flexible plastic, such as Teflon, nylon, styrene or the like. The piston is caused to move axially in the reservoir by means of a squib 64 disposed within a squib holder 66 in the end plate 12. The squib 64 is retained in place within the squib holder 66 by means of a retainer pin 68. The squib is an electrically detonated explosive charge which produces expanding gases that act on the piston 62 to move it axially in the reservoir 18 toward the divider plate 16.

A circuitboard assembly 70 is disposed within the potting compound 72 in the recess of end plate 12 outside the battery housing. The circuitboard assembly is in electrical communication with the squib by means of the interconnecting wires 74. An electrical connector 76 attached to the circuitboard assembly facilitates securing external electrical equipment to the circuitboard. The circuitboard assembly is constructed to provide a means for electrically checking to see whether the squib 64 has been fired and for electrically firing the squib, as is customary in remotely activated batteries for missile applications. The specific detail of the circuitboard assembly forms no part of the invention and can be constructed in any of the known and accepted ways.

The piston 62 is retained adjacent the end plate 12 and in close proximity of the squib 64 by a detent arrangement 78. In this manner, the piston is maintained closely adjacent the squib 64 to insure most desirable electrolyte injection performance when the squib is fired.

The manifold coupler 56 in the divider plate 16 has a diaphragm 80 therein which hermetically seals the individual cells of the battery within the area 17 of the housing. This diaphragm is preferably formed of stainless steel or the like because of its high strength and resistance to corrosion by battery electrolytes. It is preferred that the diaphragm 80 have high strength to insure against rupture prior to firing and premature rupture during firing. In general, it is preferred that the diaphragm 80 does not break until a relatively high pressure has been developed in the reservoir in order to get best electrolyte distribution to the cells.

The electrolyte (not shown) in the reservoir 18 is hermetically sealed between the diaphragm 80 and another diaphragm 82 which is located in the squib holder 66. The diaphragm 82 can be of any suitable material resistant to attack by the battery electrolyte, such as stainless steel, plastic or the like. It must be strong enough not to rupture before the squib is fired and yet break readily under the force of the exploding squib. A frangible plastic material is generally suitable.

The squib holder 66 is a hollow tube having an axially extending slot 84 in its inner periphery that communicates with a relief valve 86 by means of an interconnecting conduit 88. Rupture of the squib holder diaphragm 82 produces a direct communication between the reservoir 18 and the relief valve 86. As the relief valve is exposed to the ambient, rupture of the squib holder diaphragm automatically vents the reservoir to the ambient.

It can, therefore, be seen that when the squib 64 is fired the squib holder diaphragm 82 is ruptured permitting expanding gases to act on the piston 62. The expanding gases of the exploding squib have sufficient force to overcome the holding action of the detent arrangement 78 and cause the piston to move laterally toward the divider plate 16. The force of the gases is, therefore, imparted to the piston which exerts a pressure on the electrolyte in the reservoir 18. The electrolyte, in turn, exerts a pressure on the manifold coupler diaphragm 80. When a sufficient pressure is reached, the manifold coupler diaphragm 80 ruptures to permit the electrolyte to flow into the manifold 52. From the manifold the electrolyte passes through the apertures 54 in the inner wall 42 of the cell containers 20 into contact with the cell plates of the battery.

An extremely useful additional benefit is also derived from the described construction. Missile batteries are discharged so rapidly when they are used that a substantial amount of heat and gases, including substantial amounts of steam, are generated in the cell containers. The gases thus produced within the cell containers are readily accommodated in my battery by allowing them to pass out through the electrolyte entrance apertures 54 into the electrolyte manifold 52 and from there into the reservoir 18. In this manner the reservoir functions as a sump for the gases generated during dicharge of the battery. The reservoir area behind the piston, that is, on the squib side of the piston, can be made accessible to the discharge gases in a plurality of ways. A simple and efficient means of accomplishing this is by making the piston out of a flexible material, such as nylon, Teflon, styrene or the like and forming the piston to have a skirt 90, as sown in FIGURE 1. In such instance the expanding squib gases during detonation of the squib urge the skirt radially against the inner surface of the housing 10 to seal the skirt against the housing as the piston moves laterally against the electrolyte. However, by the time the discharge gases are generated, the pressure of the squib gases has dropped by exhausting them through the relief valve 86. The piston skirt-housing seal is no longer present and the discharge gases can pass between the piston and the housing.

Once behind the piston, the discharge gases also are vented to the ambient through the relief valve 86. The venting of both the squib detonation gases and the discharge gases involves passage through the slot 84, the passage 88 and the relief valve 86. In this action the slot 84 and passage 88 serve as an orifice valve to restrict the rate of venting. Hence, while the squib detonation gases are free to pass out the relief valve, the flow of these gases therethrough is restricted to such an extent that a sufficient pressure is momentarily achieved when the squib is fired to produce battery activation.

As previously indicated, other arrangements can be used in place of a flexible skirted piston. Various types of oneway valves can be incorporated in the piston to allow discharge gases to pass through, but not detonation gases. An orifice valve in the piston may also be useful but in most cases less desirable than a check valve construction.

The manner in which the electrolyte is introduced in the battery can be accomplished in a plurality of ways. For example, means can be provided in the radial surface of the housing to communicate with the reservoir and fill the reservoir between the piston and the divider plate with electrolyte. However, I prefer to fill the reservoir by means of a tube 92 secured to end plate 12. In such instance I evacuate the reservoir 18 by means of a vacuum pump connected to the tube 92 through a two-way valve and when essentially all gases are removed from the reservoir 18 the vacuum pump is closed off by the two-way valve and an electrolyte supply line simultaneously opened to the reservoir. The vacuum in the reservoir draws the electrolyte into the reservoir 18 through the tube 92 in end plate 12 and around the piston skirt 90. When the desired amount of electrolyte is contained in the reservoir, the filling apparatus is disconnected. The tube is then pinched shut and silver brazed to provide a hermetic seal.

It is to be understood that while I have described my invention in terms of a certain specific example, no limitation is intended thereby except as defined in the appended claims.

I claim:
1. A battery comprising a tubular housing, closures for each end of said tubular housing, a transverse divider wall in said housing forming an electrolyte reservoir compartment and a voltaic cell compartment axially aligned therein, at least one voltaic cell in said cell compartment, a piston in said reservoir, electrolyte in said reservoir between said piston and said housing divider wall, said divider wall having an aperture therein which communicates said reservoir with said cell, a rupturable diaphragm sealing said aperture to retain said electrolyte in said reservoir, means for urging said piston against said electrolyte with sufficient force to rupture said diaphragm and flow electrolyte into said cell from said reservoir, a first gas flow restriction for venting the reservoir area behind the piston to the battery ambient, a second gas flow restriction communicating reservoir areas on opposite sides of said piston to relieve gas pressure generated by said cell, and means for collecting current generated by said cell.

2. A battery comprising a tubular housing, a closure for each end of said tubular housing, a transverse divider wall in said housing forming an electrolyte reservoir compartment and a voltaic cell compartment axially aligned therein, a plurality of annular voltaic cell units axially registered in said cell compartment, the inner walls of said units forming an axially extending electrolyte manifold, a piston in said reservoir, electrolyte in said reservoir between said piston and said housing divider wall, said divider wall having an aperture communicating said reservoir with said manifold, a rupturable diaphragm in said aperture isolating said reservoir from said manifold, a first gas flow restriction for venting the reservoir area behind said piston to the battery ambient, a rupturable diaphragm isolating said flow restriction from said reservoir, gas pressure generating means in said housing for urging said piston against said electrolyte with sufficient force and rupturing said diaphragms to simultaneously flow electrolyte into said cells upon said first flow restriction, a second gas flow restriction associated with said piston for communicating reservoir areas on opposite sides of said piston to relieve gas pressure generated by said cells during discharge, and means for collecting current generated by said cells.

3. A battery comprising a tubular housing, a closure at each end of said tubular housing, a transverse divider wall in said housing forming an electrolyte reservoir compartment and a voltaic cell compartment axially aligned therein, a plurality of annular voltaic cell units axially registered in said cell compartment, the walls of said cell units forming an axially extending electrolyte manifold, a piston in said reservoir, electrolyte in said reservoir between said piston and said housing divider wall, said divider wall having an aperture communicating said reservoir with said manifold, a rupturable diaphragm in said aperture isolating said reservoir from said manifold, gas generating means in said housing for urging said piston against said electrolyte with sufficient force to rupture said diaphragm and flow electrolyte into said cells, a first gas flow restriction for venting the area behind said piston to the battery ambient through said gas generating means, a rupturable diaphragm isolating said flow restriction and gas generating means from said reservoir, a flexible skirt on said piston facing said gas generating means, the outer diameter of said skirt being slightly less than the inner diameter of the reservoir whereby cell generated gases can pass around the piston within the housing to said first flow restriction to relieve gas pressure built up within said housing, and means for collecting current generated by said cells.

4. A battery construction as recited in claim 3 which also includes detent means for locating and maintaining said piston adjacent said gas generating means until the gas generating means is actuated.

References Cited by the Examiner

UNITED STATES PATENTS

| | | | |
|---|---|---|---|
| 2,403,567 | 7/1946 | Wales | 136—90.4 |
| 2,674,946 | 4/1954 | Hjelm | 136—90 |
| 2,787,650 | 4/1957 | Blaru | 136—90 |
| 2,826,627 | 3/1958 | Aldrech | 136—90 |
| 2,847,494 | 8/1958 | Jeannin | 136—114 X |
| 2,852,592 | 9/1958 | Salauze | 136—113 X |
| 2,923,756 | 2/1960 | Hermitte | 136—90 |
| 3,005,863 | 10/1961 | Floyd et al. | 136—90 |
| 3,173,811 | 3/1965 | Amiet | 136—90 |

FOREIGN PATENTS 1,094,210    5/1955    France.

WINSTON A. DOUGLAS, *Primary Examiner.*

JOHN R. SPECK, *Examiner.*

H. FEELEY, A. B. CURTIS, *Assistant Examiners.*